United States Patent [19]

Downing et al.

[11] 4,062,209

[45] Dec. 13, 1977

[54] WHEELCHAIR LOCK

[75] Inventors: Harold A. Downing; Donald L. Rohrs; Donald L. Collins, all of Hutchinson, Kans.

[73] Assignee: Collins Industries, Inc., Hutchinson, Kans.

[21] Appl. No.: 650,308

[22] Filed: Jan. 19, 1976

[51] Int. Cl.$^2$ .......................... A47C 7/00; B60R 27/00

[52] U.S. Cl. ...................................... 70/226; 292/330; 292/341.17

[58] Field of Search ...................... 70/226, 235, 62, 66, 70/233, 59, DIG. 21, DIG. 23, 282; 297/DIG. 4; 211/18, 19; 296/65 R; 280/179 R; 292/330, 341.17, 359, DIG. 25

[56] References Cited

U.S. PATENT DOCUMENTS

| | | | |
|---|---|---|---|
| 512,548 | 1/1894 | Hurlbut | 211/20 X |
| 1,768,021 | 6/1930 | Baverband | 70/282 |
| 2,101,210 | 12/1937 | Barclay | 296/65 R |
| 2,381,633 | 8/1945 | Young | 292/341.17 |
| 3,955,847 | 5/1976 | Schiowitz | 280/179 R X |

FOREIGN PATENT DOCUMENTS

| | | | |
|---|---|---|---|
| 100,172 | 1/1925 | Austria | 70/62 |
| 478,124 | 11/1915 | France | 70/62 |
| 151,234 | 12/1931 | Switzerland | 70/59 |

*Primary Examiner*—J. Franklin Foss

*Attorney, Agent, or Firm*—Edwin H. Crabtree; John H. Widdowson

[57] ABSTRACT

A wheelchair lock for mounting in a vehicle. The vehicle is used for transporting handicapped people who are confined to a wheelchair. The lock receives a portion of the ground wheels of the wheelchair and secures the wheels thereto. The lock is manually or electrically operated for quickly releasing the wheels when it is desired to remove the wheelchair from the wheelchair lock.

12 Claims, 13 Drawing Figures

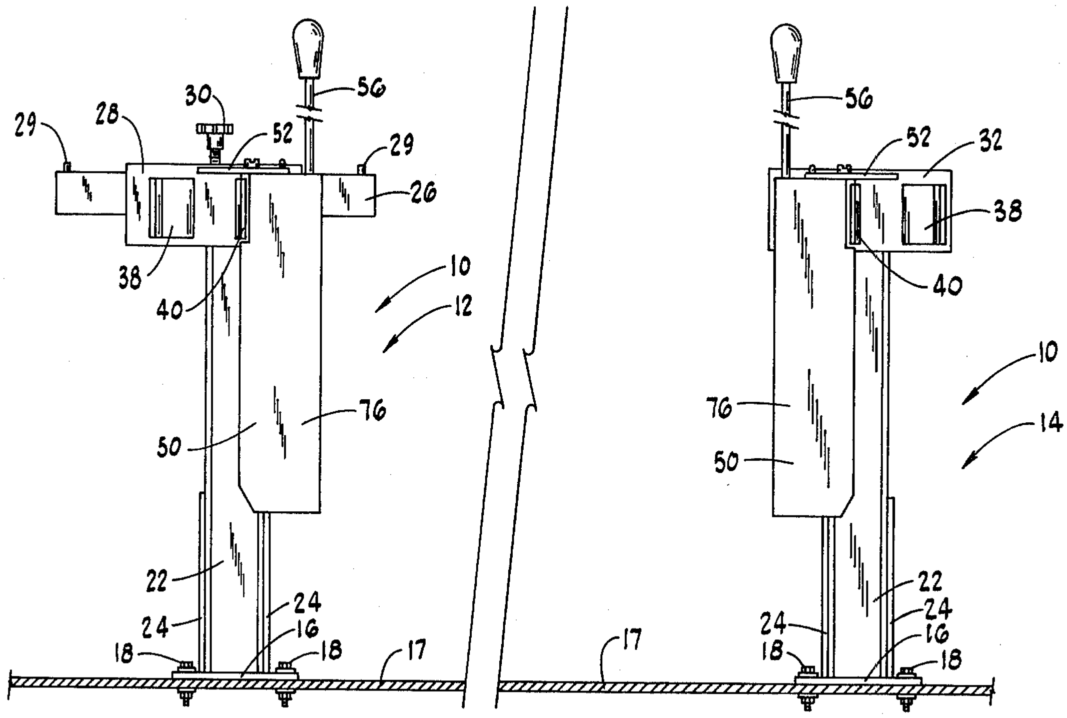
FIG-3
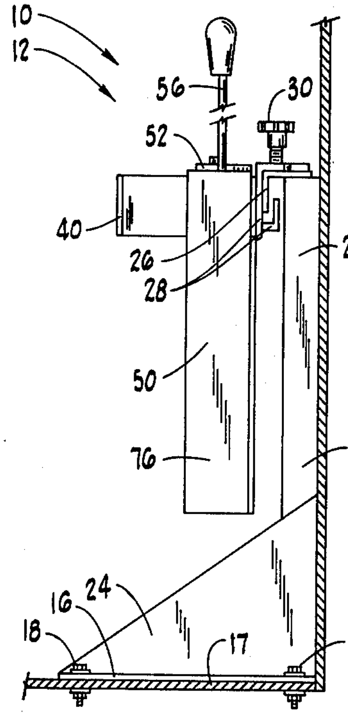
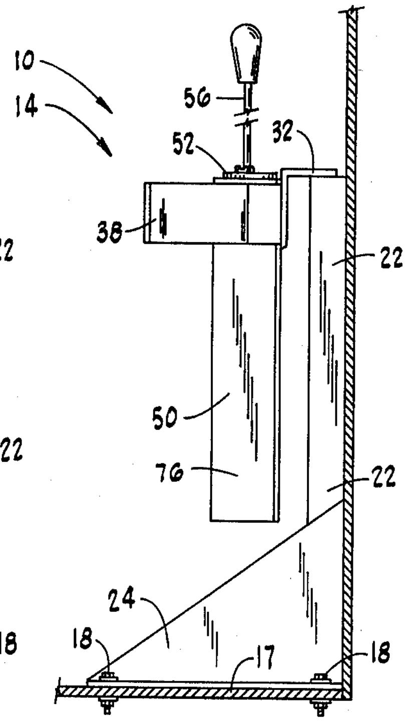
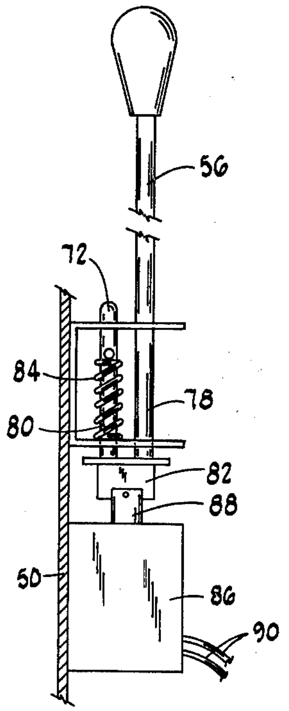
FIG-4 FIG-5 FIG-6

WHEELCHAIR LOCK

BACKGROUND OF THE INVENTION

This invention relates generally to a lock apparatus and more particularly, but not by way of limitation, to a wheelchair lock for securing a wheelchair in a moving vehicle.

Heretofore very little has been done in the art of securing wheelchairs in a vehicle and preventing the inadvertent movement of the wheelchair while the vehicle is in operation. In transporting the handicapped it can be appreciated that the movement of the wheelchair can be dangerous to the safety of the person in the wheelchair, the other occupants and the driver of the vehicle.

Prior to the subject invention the wheels of the wheelchair were secured to the floor or side panels of the transporting vehicle by a rope, chain or metal bars inserted through the spokes attached to the rim of the wheel. This type of apparatus for securing the wheels is cumbersome and time consuming to attach and remove. Also the wheels are not securely held in place. For the handicapped person in the wheelchair to lock his wheels and release the wheelchair himself is difficult, if not impossible.

The subject invention solves the above described problems and provides a novel locking device to aid in the safe transportation of the handicapped confined to a wheelchair.

SUMMARY OF THE INVENTION

The subject wheelchair lock securely holds the wheels of a wheelchair in place during the movement of a transporting vehicle.

The lock is adjustable for receiving wheelchairs having various widths between the two ground wheels of the wheelchair.

The handicapped person confined to the wheelchair or the wheelchair attendant can quickly position the wheelchair into the wheelchair lock which automatically receives the ground wheels and locks them in place.

When the vehicle is stopped and the occupants are unloaded, the wheelchair can be quickly removed from the wheelchair lock by the use of a manual release or an electrical release powered by a battery operated solenoid. The handicapped person, wheelchair attendant or vehicle driver can actuate the manual release or the electrical release.

The wheelchair lock includes a pair of stands mounted on the floor of the vehicle. The stands include adjustable wheel guide arms for receiving the ground and hand wheels of the wheelchair. Attached to the guide arms are latches which secure the ground wheel of the wheelchair inside the guide arms.

The advantages and objects of the invention will become evident from the following detailed description when read in conjunction with the accompanying drawings which illustrate the preferred embodiments of the invention.

BRIEF DESCRIPTION OF THE DRAWINGS

FIG. 3 is a front view of the wheelchair lock.

FIGS. 4 and 5 are a side view of the wheelchair lock.

FIG. 6 is a side view of the manual and electrical latch release.

FIG. 9 is a side view of the manual latch release.

DETAILED DESCRIPTION OF THE DRAWINGS

Figure 1:
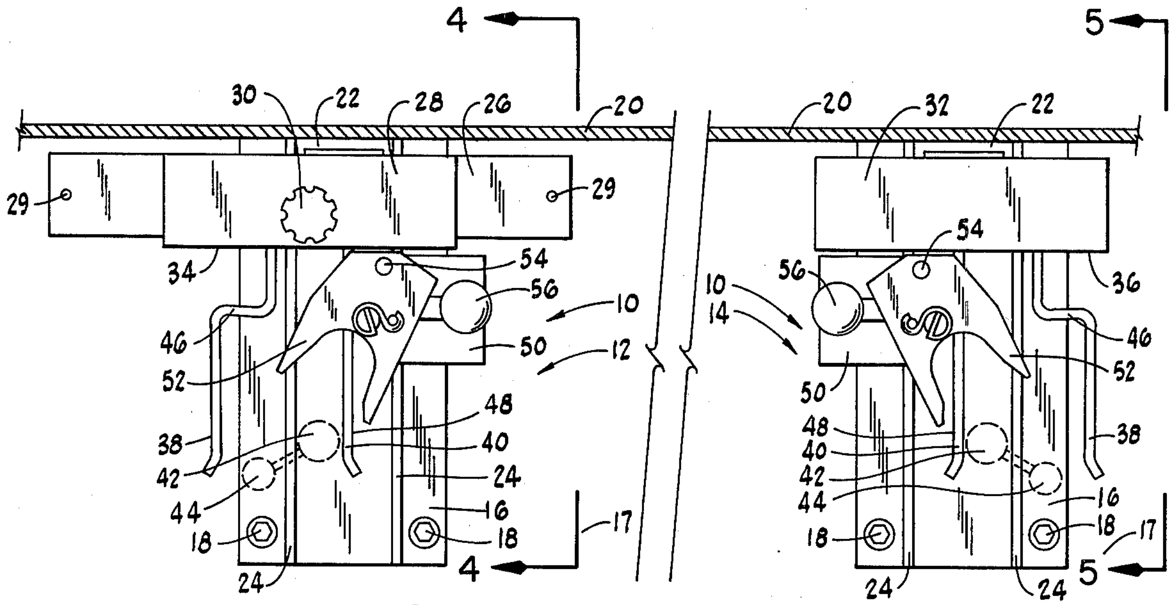
FIG. 1 is a top view of the wheelchair lock.

In FIG. 1 the wheelchair lock is designated by general reference numeral 10. The lock 10 includes a first stand 12 and a second stand 14. The stands 12 and 14 are similar in construction except the first stand 12 is horizontally adjustable so that the distance between the stands can be adjusted to receive wheelchairs having various widths between their ground wheels.

While the foregoing detailed description will disclose the lock 10 having separate stands 12 and 14 for securing both of the wheels of the wheelchair, it is understood that lock 10 could use a single stand for locking a portion of the wheel of a wheelchair. This arrangement while conceivable is not practical since only one wheel secured in a lock similar to the lock 10 may rotate therein and not adequately hold the wheelchair in place.

The stands 12 and 14 include a horizontal base 16, which is secured to a floor 17 of a vehicle by bolts 18. The base 16 is disposed adjacent a side panel 20 of the vehicle. Attached to the rear of the base 16 is a vertical pedestal 22. The pedestal 22 is rigidly secured to the base 16 by angular bracing 24.

On the first stand 12 is mounted at the top of the pedestal 22 a horizontal mounting bar 26. A slide support 28 is slidably mounted on the mounting bar 26. The slide support 28 can be moved back and forth along the length of the mounting bar 26. The length of travel of the slide support 28 is limited to the distance between mounting bar stops 29 mounted at both ends of the mounting bar 26. A setscrew knob 30 is attached to the slide support 28 for securing the slide support 28 to the mounting bar 26.

On the second stand 14, the mounting bar 26 is eliminated and a horizontally mounted L-shaped angle support 32 is secured to the top of the pedestal 22.

A first guide arm 38 and a second guide arm 40 are horizontally attached at the rear of the arms to a front side 34 of the slide support 28 and a front side 36 of the angle support 32. The guide arms 38 and 40 are used to receive a portion of a ground wheel 42 and a hand wheel 44 of the wheelchair therebetween and guide these wheels toward the rear of the stands 12 and 14. The ground wheel 42 and hand wheel 44 are shown in dotted lines. A center portion 46 of the guide arm 38 is bent at a right angle to the remaining portion of the arm 38. This portion 46 acts as a stop to contact the hand wheel 44 as the wheels are guided between the guide arms 38 and 40.

Attached to an outer side 48 of the guide arm 40 is a latch frame 50. A U-shaped wheel latch 52 is rotatably mounted on the top of the latch frame 50. The latch 52 is spring biased in an open position as shown in FIG. 1 and is in a position for receiving the ground wheel 42 of the wheelchair.

Also seen in this view is an aperture 54 positioned at the rear of the latch 52 and the top of a handle 56 used to manually release the latch 52.

Figure 1A:
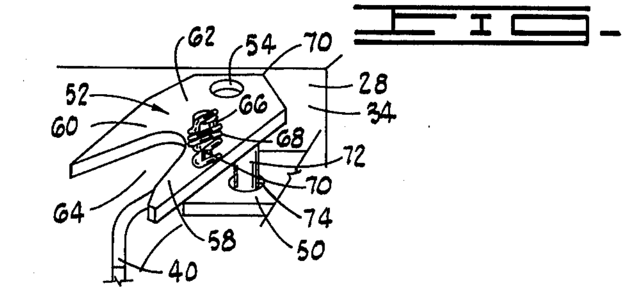
FIG. 1*a* is a perspective view of the wheel latch in an open position.

In FIG. 1a a perspective view of the U-shaped latch 52 is shown. The latch 52 includes a front portion 58, a center portion 60, and a rear portion 62. The front portion 58 includes a U-shaped open portion 64. A shaft 66 is secured to the top of the latch frame 50. The center portion 60 of the latch 52 is rotatably mounted on the shaft 66. A coil spring 68 is mounted around the shaft 66 with one end attached to the top of the shaft 66 and the other end attached to an upstanding post 70 mounted on the latch 52.

The spring 68 rotates the latch 52 on the shaft 66 until an angled edge 70 of the rear portion 62 contacts the front side 34 of the slide support 28 or the front side 36 of the angle support 32. At this position the open portion 64 of the latch 52 is facing outward for receiving a portion of the ground wheel 42 as the ground wheel 42 and hand wheel 44 are guided between the guide arms 38 and 40.

In this view the top of a vertically mounted latch plunger 72 is shown inserted through an aperture 74 in the latch frame 50. The latch plunger 72 is spring biased upwardly and against the botton of the rear portion 62 of the latch 52.

Figure 2A:
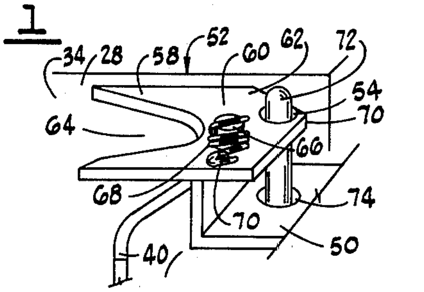
FIG. 2*a* is a perspective view of the wheel latch in a closed position.
Figure 2:
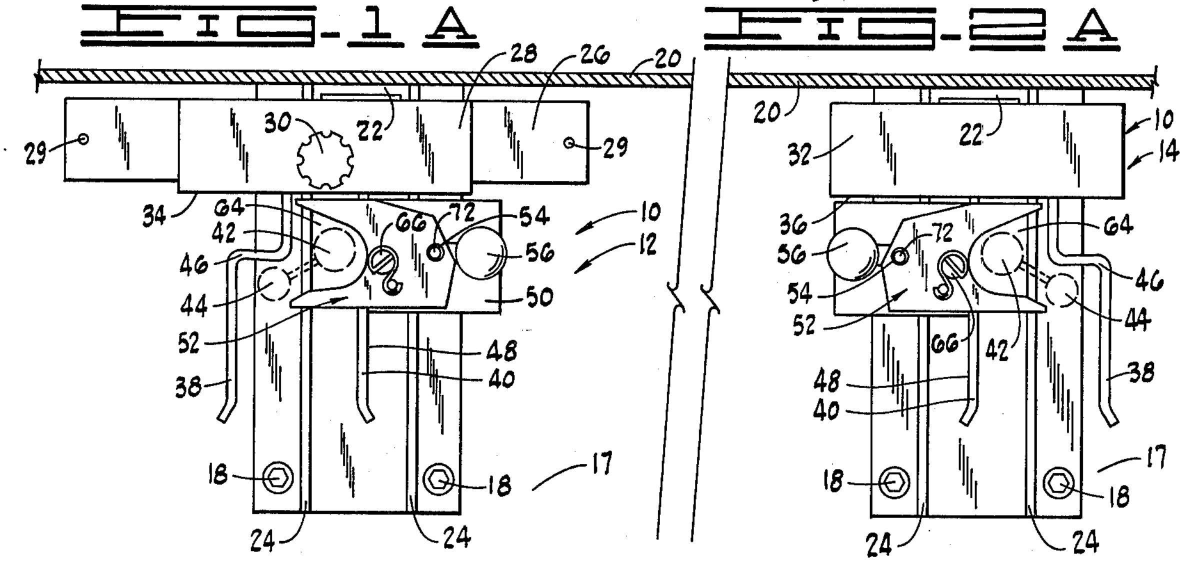
FIG. 2 is a top view of the wheelchair lock.

In FIG. 2 the lock 10 is shown with the latch 52 in a closed position securing the ground wheel 42 between the sides of the open portion 64 and the guide arms 38 and 40. The hand wheel 44 is disposed adjacent the angled center portion 46 of the guide arm 38. In this position the wheelchair is held in place in the lock 10.

In FIG. 2a a perspective view of the latch 52 as shown in FIG. 2 is seen in a closed position. In operation when the ground wheel 42 and hand wheel 44 are guided between the guide arms 38 and 40, the ground wheel 42 is received inside the open portion 64 and disposed against the sides thereof. As the wheel 42 is guided toward the rear of the stands 12 and 14 the latch 52 is rotated toward the front side 34 of the slide support 28 or the front side 36 of the angled support 32. The latch 52 continues to rotate until the front portion 58 of the latch 52 is disposed adjacent the front side 34 or the front side 36. At this position the aperture 54 is centered over the biased latch plunger 72. The plunger 72 is urged upward and is received in the aperture 54 and extends therethrough locking the latch 52 in place and securing the ground wheel 42 of the wheelchair therein.

In FIG. 3 a front view of the stands 12 and 14 is seen. By adjusting the slide support 28 on the mounting bar 26, the distance between guide arms 38 and 40 of the first stand 12 and the guide arms 38 and 40 of the second stand 14 can be adjusted horizontally. By adjusting this horizontal distance between the guide arms 38 and 40, different wheelchairs having various widths between their two ground wheels can be secured in the lock 10.

In this view the latch frame 50 is shown with a latch cover 76 used to enclose the lower portion of the manual release handle 56 and the lower portion of the latch plunger 72.

In FIG. 4 a side view of the first stand 12 is seen. The slide support 28 is shown mounted on the mounting bar 26. By turning the set screw knob 30 downward the lower portion of the slide support 28 is raised until it comes into contact with the lower portion of the mounting bar 26 and is secured thereto. Also in this view the angle bracing 24 can be seen securing the base 16 to the pedestal 22.

FIG. 5 is similar to FIG. 4 but shows a side view of the second stand 14 having the angled support 32 at one edge attached to the top of the pedestal 22 and the other edge of the angled support 32 attached to the guide arms 38 and 40.

In FIG. 6 the latch cover 76 is removed exposing the lower portion 78 of the handle 56 and the lower portion 80 of the latch plunger 72. The end of the lower portion 78 of the handle 56 is attached to the top of a plunger plate 82. The lower portion 80 of the latch plunger 72 is also attached to the top of the plunger plate 82. By pushing the handle 56 downward, the latch plunger 72 is moved downward removing the plunger 72 from the aperture 54 of the latch 52, and releasing the latch 52 to be spring biased to its open position. When the handle 56 is released, a coil spring 84 is held in compression around the plunger 72 and urges the plunger 72 upward against the bottom of the rear portion 62 of the latch 52.

The lock 10 further includes a solenoid 86 attached to the latch frame 50 and having a solenoid arm 88 attached to the bottom of a plunger plate 82. The latch 52 is also electrically operated and released by activating the solenoid 86. The solenoid 86 is electrically connected to the vehicle's battery by wiring 90. When the solenoid 86 is activated, the solenoid arm 88 is moved downward along with the connected plunger plate 82 and latch plunger 72. The plunger 72 releases the latch 52 and the latch 52 is again biased into its open position. When the solenoid 86 is deactivated, the plunger 72 is biased upward by the spring 84.

Figure 8:
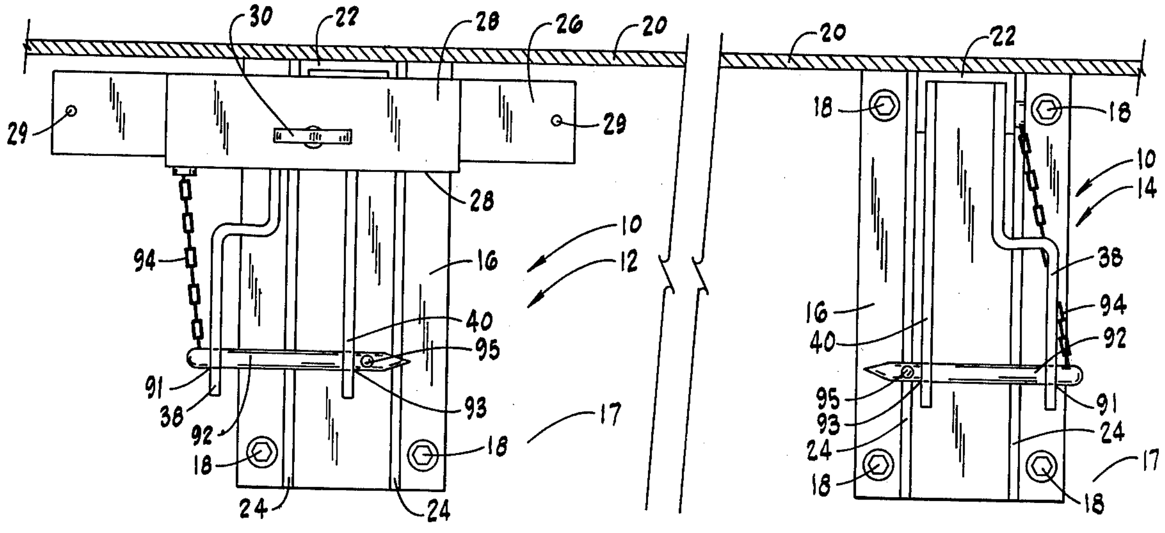
FIG. 8 is a top view of the wheelchair lock shown in FIG. 7.
Figure 7:
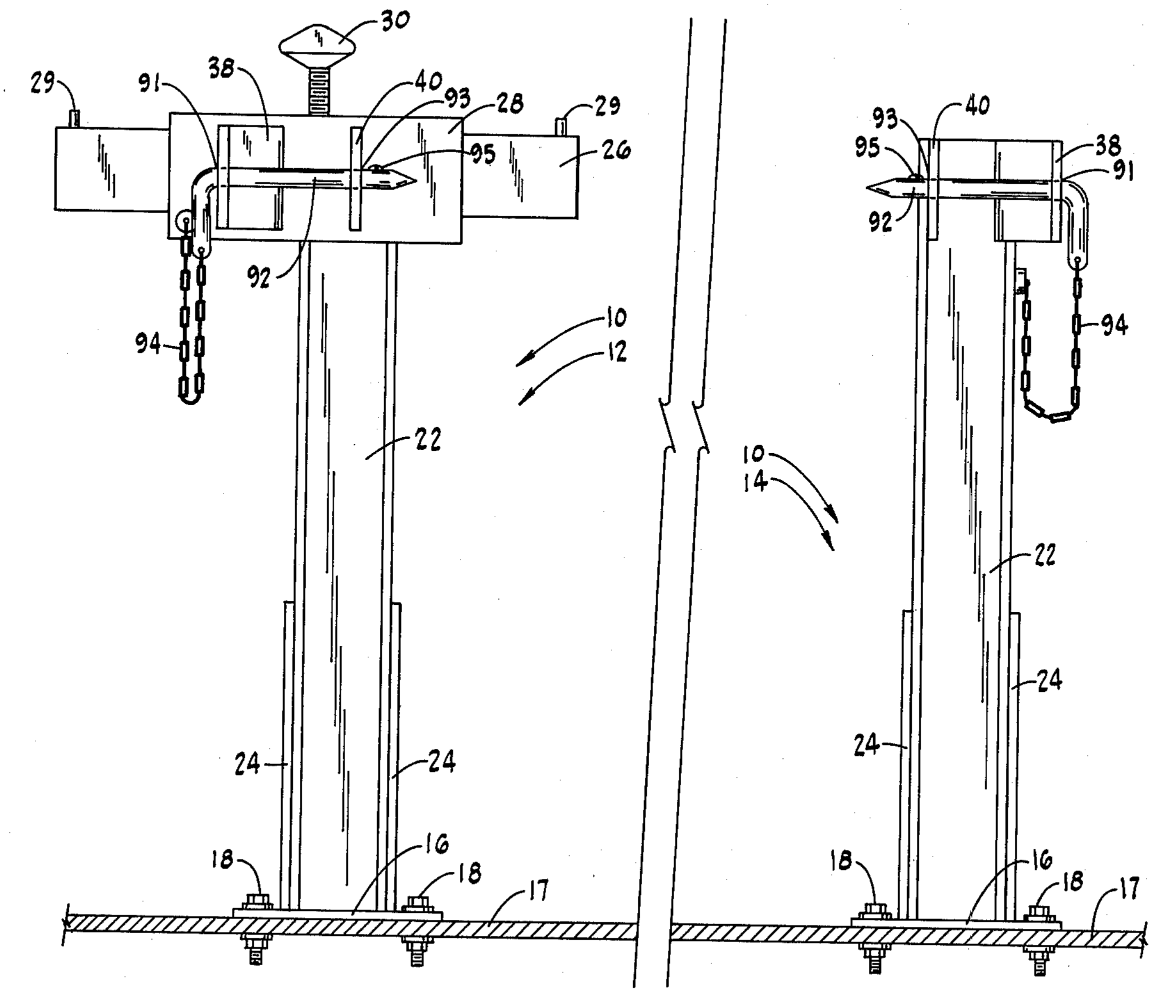
FIG. 7 is a front view of an alternate embodiment of the wheelchair lock.

In FIGS. 7 and 8 an alternate embodiment of the lock 10 is shown with stands 12 and 14 having a different type of latch for securing the ground wheels 42 between the guide arms 38 and 40.

In FIG. 7 a front view of the stands 12 and 14 is shown. Inserted into apertures 91 and 93 in the ends of the guide arms 38 and 40 is an L-shaped pin 92 having a spring biased ball 95 mounted above the end of the pin 92 for retaining the pin 92 in the guide arms 38 and 40. The pin 92 is manually operated and attached to the slide support 28 of the first stand 12 by a chain 94. The pin 92 is also attached to the pedestal 22 of the second stand 14 by the chain 94.

In operation the pin 92 is removed from the apertures 91 and 93 in the ends of the guide arms 38 and 40. The ground wheel 42 and hand wheel 44 are guided between the guide arms 38 and 40 and toward the rear of the stands 12 and 14. When the wheels 42 and 44 are in place the pin is inserted through the aperture 91 in the guide arm 38 and between the ground wheel 42 and the axle of the wheel and then through the aperture 93 in the guide arm 40. The ground wheel 44 is now secured to the lock 10 until the pin 92 is removed from the guide arms 38 and 40.

FIG. 8 shows a top view of the stands 12 and 14 with the pin 92 inserted through the apertures 91 and 93 in the ends of the guide arms 38 and 40. It should be noted that when using the pin 92 for securing the wheelchair wheels, the stand 14 shown in FIGS. 7 and 8 does not include an L-shaped angle support 32 as shown in FIG. 5. In this embodiment the guide arms 38 and 40 are attached directly to the top of the pedestal 22.

FIG. 9 is similar to FIG. 6 but discloses the plunger plate 82 without the attached solenoid arm 88 and solenoid 86. In this embodiment the latch plunger 72 is operated manually by pushing the handle 56 downward thereby moving the plunger 72 downward and releasing the latch 52.

Figure 10:
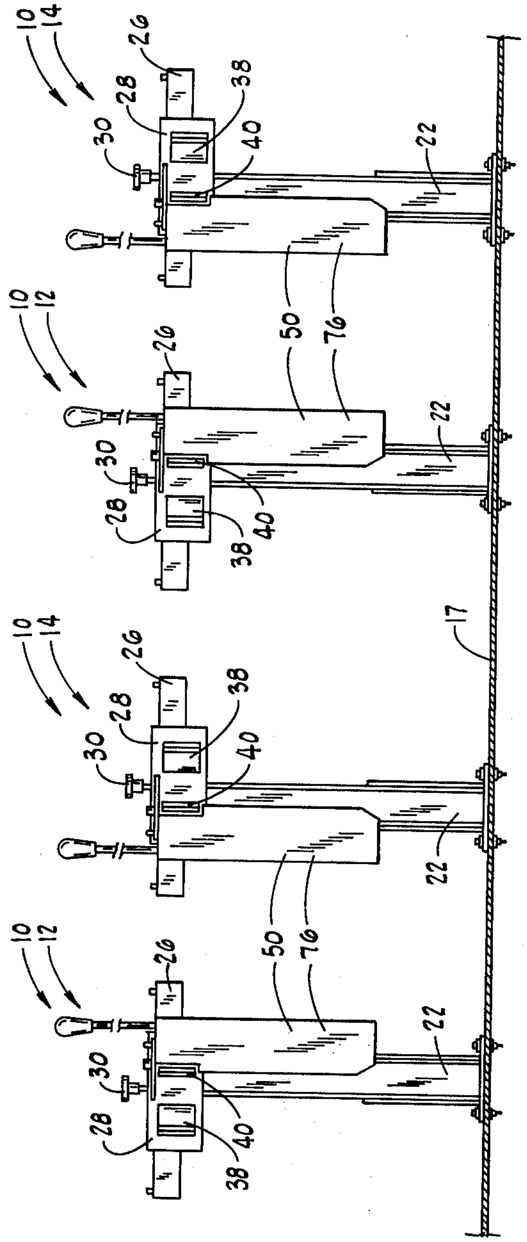
FIG. 10 is a plurality of floor mounted wheelchair locks.

FIG. 10 discloses a plurality of stands 12 and 14 mounted to the floor 17 of the vehicle for receiving a pair of wheelchairs. It should be noted that in this embodiment both the stand 12 and the stand 14 include horizontal mounting bars 26 with slide supports 28 so that by loosening setscrew knob 30 each stand can be adjusted for receiving the wheels of the wheelchair.

Figure 11:
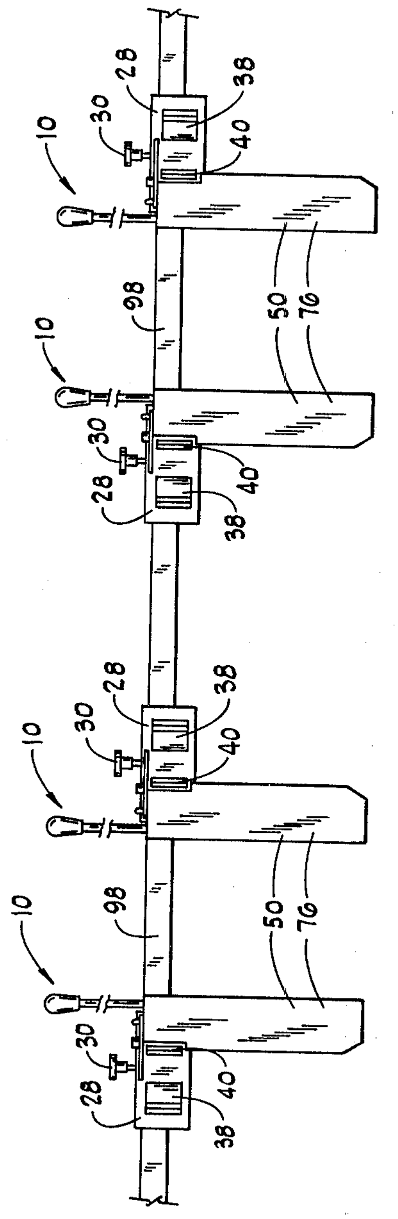
FIG. 11 is a plurality of rail mounted wheelchair locks.
Figure 8:
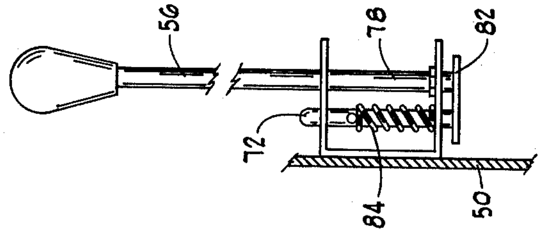

In FIG. 11 the stands 12 and 14 are eliminated and the slide supports 28 with guide arms 38 and 40 are mounted on a horizontal rail 98. The rail 98 is mounted against the side panel of the vehicle. Each of the slide supports 28 include a setscrew knob 30. By loosening the knob 30, each of the supports 28 can be adjusted on the rail 98 so that the guide arms 38 and 40 can receive wheelchairs having various widths between the wheels.

Changes may be made in the construction or arrangement of the parts or embodiments or elements of the embodiments are disclosed hererin without departing from the spirit or scope of the invention as defined in the following claims.

We claim:

1. A wheelchair lock for securing a wheelchair, the wheelchair having a pair of ground wheels with a pair of hand wheels adjacent thereto, the lock comprising:
- a first stand vertically disposed;
- a pair of first guide arms horizontally attached to the top of said first stand and extending outwardly therefrom for receiving a portion of one of the ground wheels and a portion of the adjacent hand wheel; and
- a first latch means attached to the side of one of said first guide arms, said first latch means receiving a portion of the ground wheel when the ground wheel is received between said first guide arms and securing the ground wheel between said first guide arms.

2. The lock as described in claim 1 wherein said latch means attached to said guide arms of said first stand and said second stand is a pivotally attached U-shaped spring biased latch, said latch biased in an open position for receiving a portion of the wheel of the wheelchair in the U-shaped portion of said latch as the wheel is received between said guide arms, when contacted by the wheel said latch rotating to a closed position and securing the wheel between said guide arms.

3. The lock as described in claim 2 wherein said latch means further includes a vertically mounted spring biased latch plunger attached to said guide arms, said plunger biased against the bottom of said latch when said latch is in an open position, when said latch is rotated to the closed position the plunger is received in an aperture in said latch and said latch is locked in a closed position.

4. The latch as described in claim 3 wherein said latch means further includes a manual release handle vertically mounted and attached to said latch plunger and disposed adjacent thereto, by moving said manual release handle downward said latch plunger is moved downward removing said latch plunger from the aperture in said latch thereby releasing said latch from a closed position.

5. The latch as described in claim 2 wherein said latch means further includes a solenoid attached to said guide arms and having a solenoid arm attached to said latch plunger, said solenoid when electrically activated urging said solenoid arm downward and moving said latch plunger downward removing said latch plunger from the aperture in said latch thereby releasing said latch from a closed position.

6. The lock as described in claim 1, further including:
- a second stand vertically disposed and adjacent said first stand;
- a pair of second guide arms horizontally attached to the top of said second stand and extending outwardly therefrom for receiving a portion of the other ground wheel and the other adjacent hand wheel; and
- a second latch means attached to the side of one of said second guide arms, said latch means receiving a portion of the other ground wheel of the wheelchair when the ground wheel is received between said second guide arms and securing the other ground wheel between said second guide arms.

7. The lock as described in claim 1, further including:
- a mounting bar horizontally attached to the top of said first stand;
- a slide support slidably mounted on said mounting bar; and
- said slide support attached to said first guide arms, said first guide arms horizontally adjustable when said slide support is adjusted on said mounting bar.

8. The lock as described in claim 6, wherein said first and second latch means are pivotally attached "U" shaped spring bias latches, each of said latches biased in an open position for receiving a portion of the ground wheel of the wheelchair in the "U" shaped portion of said latch, the ground wheel when received between said guide arms contacting said latch and rotating said latch into a closed position thereby securing the ground wheel between said guide arms and the sides of said latch.

9. The lock as described in claim 8, wherein each of said latches further include a vertically mounted spring bias latch plunger attached to said guide arms, said plunger biased against the bottom of said latch when said latch is in an open position, when said latch is rotated to a closed position, the plunger is received in an aperture in said latch and said latch is locked in a closed position.

10. The latch as described in claim 9, wherein each of said latches further include a manual release handle vertically mounted and attached to said latch plunger and disposed adjacent thereto, by moving said handle downward, said latch plunger is moved downward removing said latch plunger from the aperture in said latch thereby releasing said latch from a closed position.

11. The latch as described in claim 9, wherein each of said latches further include a solenoid attached to said guide arms and having a solenoid arm attached to said plunger, said solenoid when electrically activated urging said solenoid arm downward and moving said latch plunger downward removing said latch plunger from the aperture in said latch thereby releasing said latch from a closed position.

12. A wheelchair lock for securing a wheelchair, the wheelchair having a pair of ground wheels with hand wheels adjacent thereto, the lock comprising:
- a first stand vertically disposed;
- a mounting bar horizontally attached to the top of said first stand;
- a slide support slidably mounted on said mounting bar;

a pair of first guide arms horizontally attached to said slide support, said arms extending outwardly from said slide support for receiving a portion of one of the ground wheels and adjacent hand wheel;

a second stand vertically disposed;

a pair of second guide arms horizontally attached to the top of said second stand and extending outwardly therefrom for receiving a portion of the other ground wheel and adjacent hand wheel;

a first "U" shaped spring bias latch attached to one of said first guide arms and biased in an open position for receiving a portion of one of the ground wheels of the wheelchair in the "U" shaped portion of said first latch when the wheel is received between said first guide arms;

a first vertically mounted spring bias latch plunger attached to one of said first guide arms, said plunger biased against the bottom of said first latch when said latch is in an open position, when said first latch is rotated to a closed position, the first plunger is received in an aperture in said first latch and said first latch is locked in a closed position;

a second "U" shaped spring bias latch attached to one of said second guide arms, said second latch biased in an open position for receiving a portion of the other ground wheel of the wheelchair in the "U" shaped portion of said second latch when the wheel is received between said second guide arms; and a second vertically mounted spring bias latch plunger attached to one of said second guide arms, said second plunger biased against the bottom of said second latch when said second latch is in an open position, when said second latch is rotated to the closed position, the second plunger is received in an aperture in said second latch and said second latch is locked in a closed position.

* * * * *